D. W. Colburn.
Hoe.
No. 68,489. Patented Sep. 3, 1867.
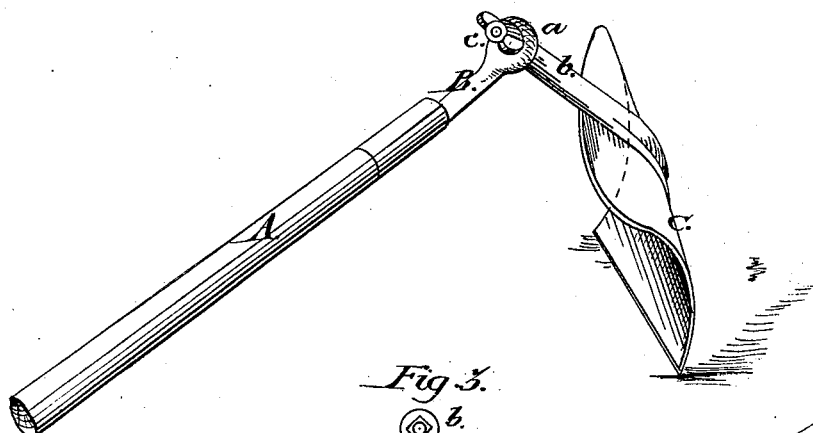
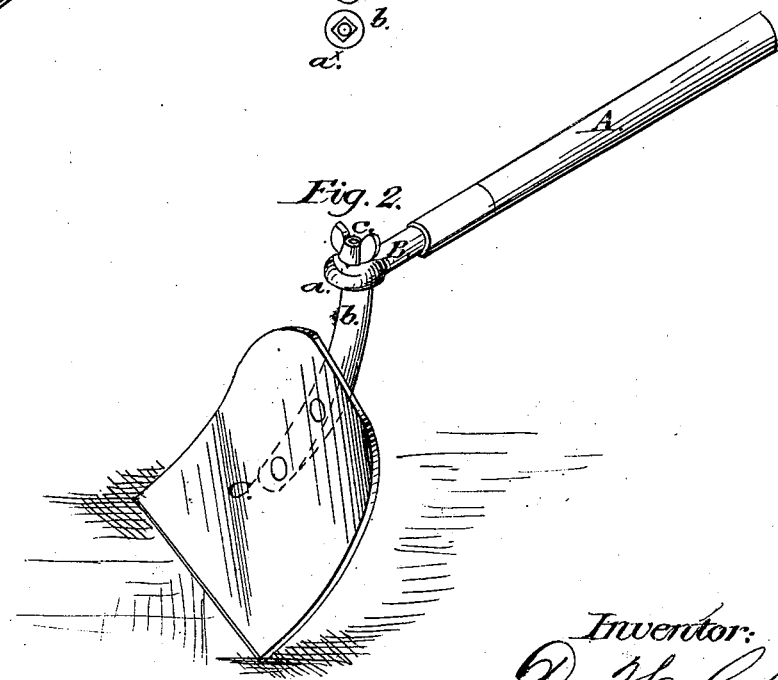
Witnesses:
Theo. Tusche
Wm. Treurer
Inventor:
D. W. Colburn
Per Munn & Co.
Attorneys

United States Patent Office.

DANIEL W. COLBURN, OF LOAMI, ILLINOIS.

Letters Patent No. 68,489, dated September 3, 1867.

IMPROVEMENT IN COMBINED PLOUGH AND HOE.

*The Schedule referred to in these Letters Patent and making part of the same.*

TO ALL WHOM IT MAY CONCERN:

Be it known that I, DANIEL W. COLBURN, of Loami, in the county of Sangamon, and State of Illinois, have invented a new and improved Combined Hand-Plough and Hoe, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention consists in constructing the blade of a hoe with a curve or bend somewhat similar to the mould-board of a plough, so that it will, when in use, cast or throw the earth to one side, and the invention further consists in attaching the blade to the handle in such a manner that it may be reversed and used either like an ordinary hoe, or, by shoving it forward, operate like a plough and make a continuous furrow to receive seeds. The invention possesses the advantage of turning over the soil so as to bury weeds and expose the roots thereof to promote their decay. It also possesses peculiar advantages in hilling up vegetables or plants, admitting of the same being done with greater ease or convenience than with the ordinary hoe. In the accompanying sheet of drawings—

Figures 1 and 2 represent perspective views of my invention, fig. 1 showing it adapted for use as a hoe, and fig. 2 showing it adapted for use as a hand-plough.

Figure 3, a plan or top view of the tang with the handle removed.

Similar letters of reference indicate like parts.

A represents the handle of the hoe, which may be constructed of wood in the usual manner, and has an iron shank or tang, B, inserted in its lower end and slightly curved. This tang B is formed with an eye, $a$, at its outer end, which eye has a square interior to receive a square, $a^\times$, on the upper end of the tang $b$ of the hoe-blade C, and the end of the tang above the square is cylindrical, and has a screw-thread cut upon it to receive a thumb-nut, $c$, by screwing up which the eye $a$ is pressed down upon a shoulder on the tang and firmly secured in position. The hoe-blade C is curved or bent so as to resemble the mould-board of a plough and cast the earth to one side as the implement is used. Its operation therefore is widely different from the ordinary hoe, which draws the earth before it. By having the blade curved so as to throw or cast the earth at one side weeds are covered and their roots exposed, and plants or vegetables may be hilled up with greater facility than usual. By unscrewing the nut $c$ and withdrawing the square of the tang from the eye $a$, and turning the hoe-blade half around, and then inserting the square of the tang in the eye and screwing the nut on the tang again, the device may be used as a hand-plough, a continuous drill being formed by shoving the device forward. This will prove very convenient for forming drills to receive seed, and also for earthing up drills of small plants, etc., etc.

This simple implement may be used in all cases where a common or ordinary hoe is required, and when the blade is reversed and applied to the handle work may be performed with it which cannot be done with the ordinary hoe. It also may be manufactured at about the same cost as a good hoe of ordinary construction.

Having thus described my invention, I claim as new, and desire to secure by Letters Patent—

A hoe, having its blade C constructed of curved form similar to the mould-board of a plough in order to cast or throw the earth at one side, substantially as and for the purpose set forth.

DANIEL W. COLBURN.

Witnesses:
B. W. UNDERWOOD,
J. W. WOOD.